United States Patent [19]

Champ et al.

[11] 3,898,084

[45] Aug. 5, 1975

[54] ELECTROPHOTOGRAPHIC PROCESSES USING DISAZO PIGMENTS

[75] Inventors: Robert Bruce Champ; Meredith David Shattuck, both of San Jose, Calif.

[73] Assignee: International Business Machines Corporation, Armonk, N.Y.

[22] Filed: Oct. 1, 1973

[21] Appl. No.: 402,498

Related U.S. Application Data

[63] Continuation-in-part of Ser. No. 129,635, March 30, 1971, abandoned.

[52] U.S. Cl. .................... 96/1.5; 96/1.6; 260/148
[51] Int. Cl.² .................... G03G 5/06; G03G 13/22
[58] Field of Search ................ 96/1.5, 1.6; 260/148

[56] References Cited

UNITED STATES PATENTS

| | | | |
|---|---|---|---|
| 3,591,374 | 7/1971 | Seus | 96/1.6 |
| 3,634,079 | 1/1972 | Champ et al. | 96/1.6 X |
| 3,684,548 | 8/1972 | Contois | 96/1.6 X |
| 3,775,105 | 11/1973 | Kukla | 96/1.5 X |

*Primary Examiner*—Roland E. Martin, Jr.
*Attorney, Agent, or Firm*—Joseph G. Walsh

[57] ABSTRACT

Electrophotographic processes using as the photoconductive material disazo pigment present as very small particles in an amount up to 10 percent of the total weight of the pigment particles plus the charge transport material.

11 Claims, No Drawings

ELECTROPHOTOGRAPHIC PROCESSES USING DISAZO PIGMENTS

BACKGROUND OF THE INVENTION

1. Field of the Invention

This invention relates to electrophotographic processes and photoconductive plates used therein. In particular it is concerned with plates comprising certain disazo pigments.

2. Description of Prior Art

U.S. Pat. No. 3,384,566 is concerned with photoelectrophoresis. The patent discloses certain disazo compounds (Pyrazolone red B and Diane Blue in column 13) for use in photoelectrophoresis.

U.S. Pat. No. 3,384,488 is also concerned with photoelectrophoresis. The disazo compound Diane Blue is disclosed therein (see Example (XXII). That patent also discloses milling of the pigment to particles of less than 1 micron size (see column 12, line 58).

U.S. Pat. No. 3,663,636, concerned with a binder type photoconductive element, suggests micropulverizing organic photoconductors.

In other places in the prior art, milling of photoconductor to obtain small particle size is also shown.

No prior art reference of which we are aware, however, suggests the advantages obtained in the present invention, which involves the use of certain selected disazo compounds as very small sized particles in electrophotographic reproduction processes, which are distinguishable from photoelectrophoresis in that selective photoconductivity, and not migration of the pigment, is involved.

SUMMARY OF THE INVENTION

According to the present invention, electrophotographic plates are prepared comprising certain selected disazo pigments. The disazo pigments useful in the present invention include those having the structural formula

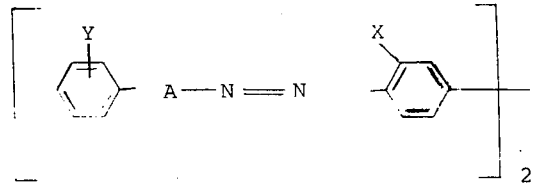

wherein A is selected from the group consisting of:

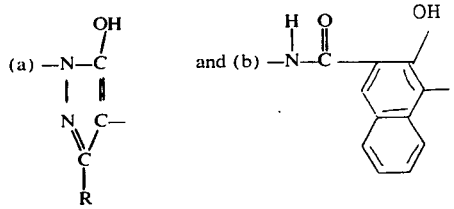

wherein R is selected from the group consisting of lower alkyl and

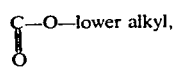

and X and Y are each selected from the group consisting of: $H, CH_3, OCH_3, OC_2H_5, OH, CL$ and $Br$.

It has now been discovered that when pigments having the formula disclosed above are present in an electrophotographic plate in particle size less than about 5 microns in diameter, and preferably less than 1 micron in diameter, they are very effective charge generators. The particles should be dispersed in a charge transport medium, and present as individual particles not touching each other; this occurs when the pigment particles are present in an amount up to 10% of the total weight of the pigment particles plus the charge transport medium. As little as 1 percent by weight can be used in some cases, but in general from about 3 to about 6 percent is preferred. Alternatively, the particles may be overcoated by a charge transport layer. In either case, however, there is injection of charge from the pigment to the transport material, in distinction over the prior art.

There are several well-known electrophotographic reproduction processes in current use. They differ in the particular way in which they are carried out, particularly the sequence in which electric charging (usually with a corona) and illumination are carried out. All electrophotographic reproduction processes, however, involve the process step of selectively rendering portions of a photoconductor electrically conductive by selective exposure to light. The pigments of the present invention are useful in all such processes.

Compounds of the above formulas may all be prepared by well-known procedures picking the properly substituted starting materials in each case, and carrying out the synthesis by methods in accordance with the teachings of the prior art.

It must be emphasized that the particles of pigment are not dissolved; i.e., they are not present as single molecules in a solution. Rather they are present as polymolecular aggregates. The use of the word pigment to describe the materials is in accord with this fact, since the word pigment in the art is usually used to describe a colored particle which is not in solution, as contrasted to the word dye, which is used to describe a colored material which is in solution.

As mentioned previously, the pigment size should be less than 5 microns in diameter. Preferably the pigment size is less than about 1 micron in diameter. Furthermore, there is some evidence to suggest that in at least some cases it is advantageous that the particle sizes are close to uniform.

In accordance with the present invention, the pigments may be used in the form of a thin layer on a conductive substrate. The layer may be overcoated with a charge transport layer. Systems of this sort are described in U.S. Patent application Ser. No. 99,647, filed Dec. 18, 1970, by Herrick and Shattuck.

The pigments are present in a charge transport binder medium, which may be either photoconductive per se or not photoconductive per se. There are many binders known to the prior art as being useful in the making of photoconductive plates. They include numerous resins and the like. Many such materials are mentioned, for example, in U.S. Pat. Nos. 3,121,006, and 3,121,007. Among the charge transport resins found useful in the present invention, polyesters have been particularly outstanding, for example, Myler adhesive 49,000, which is duPont's trademark for a 60/40 copolymer of ethylene terephthalate and ethylene isophthalate. Polyketones are also useful, e.g., PK 252, Union Carbide's trademark for a polyketone. It is not, however, necessary that the binder be a resin. For example, U.S. Pat. No. 3,406,063 lists non-polymeric coating-forming materials which may also be used in the present invention. It should also be mentioned that sucrose benzoate gives excellent results when used as a binder in the present invention.

The binder material may also be photoconductive per se. A particularly useful photoconductive binder is the photoconductor described and claimed in U.S. Pat. No. 3,484,237 of Shattuck and Vahtra. This patent describes a photoconductive material which is formed from polyvinyl carbazole and trinitrofluorenone.

To increase the photoconductivity of some of the above-described photoconductive pigments, there may be incorporated in the pigment either a sensitizer or an activator which is also known as an electron acceptor or, in some cases, when the photoconductor is an electron acceptor, an electron donor. Examples of such dye sensitizers and activators are set forth in U.S. Pat. Nos. 3,037,861, 3,169,060, and 3,287,113. In addition, when it is desired to have the photoconductive element exhibit persistent conductivity, the dye sensitizer and activator combinations described in U.S. Pat. Nos. 3,512,966 may be used in the preparation of such photoconductive elements.

Many of the pigments useful in the present invention have been listed in the Colour Index published jointly by the Society of Dyers and Colourists in England and the American Association of Textile Chemists and Colorists, Lowell, Massachusetts, U.S.A., Second Edition, 1956. In some cases below, they are referred to by their Color Index number, or C.I.

While the invention has been particularly shown and described with reference to a preferred embodiment thereof, it will be understood by those skilled in the art that various changes in the form and details may be made therein without departing from the spirit and scope of the invention.

EXAMPLES

EXAMPLE 1

The pigment used in the following example is called Diane Blue (C.I. 21,180). Chemically it is 3,3' dimethoxy-4,4' diphenyl bis-(1''-azo-2''hydroxy-3''-naphthanilide). A 5 percent suspension of Diane Blue in tetrahydrofuran (THF) was attrited to a particle size of about 1 micron by grinding with steel balls.

This mixture was added at an 8 percent by weight level of addition to a mixture of 1 part Mylar adhesive 49,000 and 1 part 2,4,7 Trinitro-9-fluorenone (TNF). This total mixture is thoroughly dispersed by roller milling and is then coated at 25 percent solids on aluminized Mylar giving a thickness of about 15μ. (Mylar is duPont's brand of polyethylene terephthalate.)

This photoconductive plate was capable of making excellent images at photographic speeds 2 to 4 times that of commercially available selenium with a tungsten-iodide light source.

EXAMPLE 2

The 5 percent Diane Blue THF attributed mixture as described in Example 1 is diluted to 2 percent by addition of THF and this solution is coated on aluminized Mylar subbed with a 0.2μ coating of Elvamide 8061 to promote adhesion and flexibility. Thickness of the Diane Blue layer is about 0.5μ. (Elvamide 8061 is an alcohol soluble polyamide resin from duPont.) The pigment is present at about 5 percent concentration by weight.

To this is coated the polyester resin/TNF mixture described in the above example at a thickness of about 10μ.

This photoconductive plate was capable of photosensitivity equal to or above that described in Example 1.

EXAMPLE 3

This experiment used a layered composition utilizing the 1:1 polyester/TNF mixture as a subbing layer under the coating described in Example 1 to increase dark change Acceptance. The pigment was present at about 5 percent concentration by weight.

Excellent images were obtained with this film at 2 to 4 times the rate of an organic photoconductor commercially available using tungsten-iodide light source.

EXAMPLE 4

A layered system as described in Example 2 was used, except the top layer consists of 20 percent by weight TNF in polyvinylcarbazole. Thicknesses are the same as described in Example 2, with the pigment present at about 5 percent concentration by weight. Images were obtained at ~2 times that of commercially used organic photoconductors using green light.

EXAMPLE 5

The preferred pigment for use in the present invention is called "Chlorodiane Blue." It differs from Diane Blue in that it has chloro groups, instead of methoxy groups, on the benzidine nucleus. The synthesis of Chlorodiane Blue is outlined below. It is illustrative of the general type of synthesis which may be used to prepare structurally related pigments.

10g (.04 mol) of 3,3'dichlorobenzidene is diazotized 15°C in 150cc 18 percent HCl by dropwise addition of 5N $NaNO_2$ (0.08 mol). The solution is checked for excess nitrite to assure complete reaction by use of the indicator 3,7-thiaxanthene diamine 5,5-dioxide in dilute HCl. The unreacted 3,3'-dichlorobenzidene is filtered off, and to the filtrate is added 80cc H BF 4 (48 percent) and the mixture is stirred for 20 minutes. The pale yellow precipitate is filtered off, washed with ethanol and ether and dried. The solid is then recrystallized from 400cc water at 55°C using charcoal.

8.5g (.02 mol) of the solid diazonium salt obtained above is dissolved in 200 ml dimethyl formamide (DMF) and added to a solution of 11.6g (.044 mol) of 2-hydroxy-3-naphthanilide coupler in 1500 ml DMF at 10–15''C. A solution of 20g sodium acetate in 300 ml water is added slowly with vigorous stirring. The mixture is stirred at room temperature for 1.5 hours and filtered. The compound is then stirred in 2l. water for at least 8 hours, filtered and washed with water. The solid is then stirred in 1.5l. DMF for 1 hour, filtered, washed with DMF and again stirred in DMF overnight, filtered, washed with DMF, acetone and ether to remove all DMF and the compound is then dried under vacuum at 50°C. Yield ~13.0g.

EXAMPLES 6 to 28

In the following set of Examples, pigments lettered A through G were used. Their structures are given below.

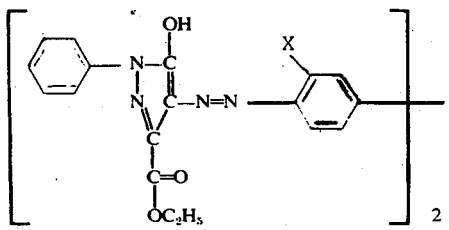

Pigment A: X = H
B: X = $CH_3$
C: X = $OCH_3$
D: X = Cl

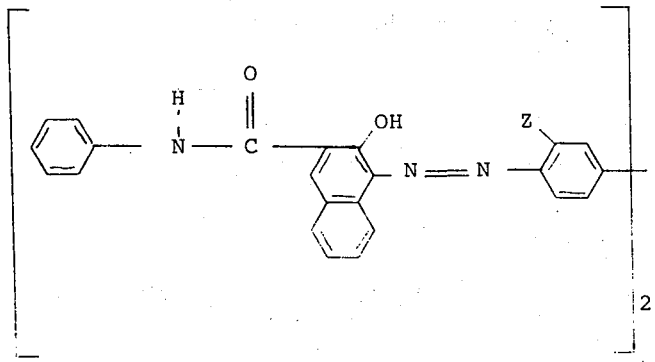

Pigment E: Z = $OCH_3$
F: Z = $CH_3$
G: Z = Cl

The electrophotographic data obtained by the use of Pigments A through G are shown in the following Tables I through III.

In Table I below, the milled pigments, at a 10 percent by weight concentration, were dispersed in a photoconductive resin charge transport binder. The binder was 20 percent by weight trinitrofluorenone and 80 percent by weight polyvinyl-carbazole. The binder-pigment mixture was again coated on a conductive substrate. The expression "full Tungsten" used below means that the illumination was from a tungsten halogen lamp, 75 watts, 28 volts at a distance of 15 cm. (NDS refers to the use of a neutral density screen, and OG to the use of an opal glass diffuser.)

TABLE I

| EXAMPLE NUMBER | PIGMENT DESIGNATION | LIGHT DECAY T ½ (1.16 NDS + OG) (Sec.) | | CHARGE ACCEPTANCE (volts) | |
|---|---|---|---|---|---|
| | | (+) | (−) | (+) | (−) |
| 6 | A (H) | 1.1 | 12.0 | 700 | 500 |
| 7 | B ($CH_3$) | 1.45 | 2.90 | 800 | 780 |
| 8 | C ($OCH_3$) | 0.95 | 5.5 | 770 | 640 |
| 9 | D (Cl) | 2.5 | 5.6 | 600 | 780 |
| 10 | E ($OCH_3$) | 0.3 | 2.2 | 500 | 820 |
| 11 | F ($CH_3$) | 0.55 | 1.55 | 670 | 730 |
| 12 | G (Cl) | 1.0 | 1.9 | 800 | 740 |
| 13 | No pigment added | 3.0 | 3.5 | 880 | 880 |

In Table II below, a 10 percent by weight of the milled pigment was dispersed in a resin binder which was a 1:1 by weight mixture of trinitrofluorenone and Mylar adhesive 49,000. The mixture was coated on a conductive substrate.

TABLE II

| EXAMPLE NUMBER | PIGMENT DESIGNATION | LIGHT DECAY T ½ (1.16 NDS+OG) (sec) | | CHARGE ACCEPTANCE (volts) | |
|---|---|---|---|---|---|
| | | (+) | (−) | (+) | (−) |
| 14 | A (H) | 9.0 | 2.45 | 1060 | 800 |
| 15 | B ($CH_3$) | 7.5 | 1.65 | 900 | 940 |
| 16 | C ($OCH_3$) | 8.1 | 6.0 | 980 | 900 |
| 17 | D (Cl) | 17.0 | 10.0 | 1150 | 1200 |
| 18 | E ($OCH_3$) | 1.6 | 0.8 | 700 | 900 |
| 19 | F ($CH_3$) | 2.5 | 0.45 | 660 | 840 |
| 20 | G (Cl) | 4.0 | 0.8 | 530 | 1050 |
| | No pigment added (Control) | Too slow to measure | | | |

In Table III below, the milled pigment, at a 5 percent by weight level, was added to a photoconductive resin binder which was a 1:1 molar mixture of trinitrofluorenone and polyvinyl carbazole (based on the monomer weight).

TABLE IV

| EXAMPLE NUMBER | PIGMENT STRUCTURE | ELECTROMETER DATA CHARGE ACCEPTANCE | T ½ (Full Tungsten) |
|---|---|---|---|
| 29 | D | + 1,000 V | 0.25 sec |
| 30 | C | + 900 V | 0.08 sec |
| 31 | B | + 530 V | 0.1 sec |
| 32 | G | + 265 V | 0.08 sec |
| 33 | E | + 490 V | 0.05 sec |
| 34 | F | + 530 V | 0.07 sec |

TABLE III

| EXAMPLE NUMBER | PIGMENT DESIGNATION | LIGHT DECAY T ½ (1.16 NDS+OG) (sec) | | CHARGE ACCEPTANCE (volts) | |
|---|---|---|---|---|---|
| | | (+) | (−) | (+) | (−) |
| 21 | A (H) | 0.9 | 0.7 | 620 | 700 |
| 22 | B (CH$_3$) | 1.7 | 0.65 | 540 | 760 |
| 23 | C (OCH$_3$) | 1.1 | 1.1 | 600 | 600 |
| 24 | D (Cl) | 1.6 | 0.9 | 580 | 580 |
| 25 | E (OCH$_3$) | 1.9 | 0.65 | 320 | 450 |
| 26 | F (CH$_3$) | 1.43 | 0.35 | 800 | 580 |
| 27 | G (Cl) | 2.6 | 0.25 | 400 | 700 |
| 28 | No Pigment added | 1.6 | 1.0 | 680 | 780 |

EXAMPLES 29–34

The following pigments were milled in a Spex mixer at a 5 percent solids concentration in tetrahydrofuran (THF) and then coated at 1 mil wet gap on rough stock aluminum. They were then overcoated with a 1:1 by weight mixture of trinitrofluorenone and Mylar adhesive 49,000 dissolved in THF, at a thickness of about 10 microns. The pigment structures are as lettered above in Examples 6–28. The electrometric data are shown in Table IV.

EXAMPLES 35–69

Milled Diane Blue pigment, at a concentration of 10 percent by weight, was dispersed in a wide variety of polymer sensitizer combinations, and the resulting mixtures coated on a conductive substrate at thicknesses ranging from 12 to 20 microns. The plates were oven-cured at 55 percent C for 2 hours, and the electrometric data shown in Table V were obtained. In all cases, full tungsten light was employed.

TABLE V

| EX. NO. | SENSITIZER | % | POLYMER | % | C.A. + | C.A. − | T ½ + | T ½ − |
|---|---|---|---|---|---|---|---|---|
| 35 | 1,8-eihydroxy-anthraquinone | 25 | polyvinyl-carbazole | 75 | 410 | 480 | 0.95 | 1.0 |
| 36 | ditto | 50 | poly-4-vinyl-dibenzofuran | 50 | 370 | 410 | 2.0 | 2.7 |
| 37 | ditto | 50 | polyketone (PK 252) | 50 | 350 | 410 | 0.6 | 0.9 |
| 38 | ditto | 50 | poly-(p-phenoxyphenyl)sulfide | 50 | 220 | 220 | 1.2 | 1.2 |
| 39 | ditto | 50 | poly-2-vinyl fluorene | 50 | 450 | 510 | 2.1 | 2.1 |
| 40 | 1,4-naphtha-quinone | 50 | polyvinyl-carbazole | 50 | 380 | 350 | 4.5 | 2.2 |
| 41 | ditto | 50 | poly-4-vinyl-benzofuran | 50 | 420 | 350 | 10.1 | 10.0 |
| 42 | ditto | 50 | polyketone (PK 252) | 50 | 250 | 240 | 1.9 | 1.5 |
| 43 | ditto | 50 | poly-(p-phenoxy-phenyl)sulfide | 50 | 380 | 380 | 2.0 | 2.0 |
| 44 | ditto | 50 | poly-2-vinyl fluorene | 50 | 380 | 350 | 1.1 | 1.2 |
| 45 | ditto | 50 | poly-2-vinyl naphthalene | 50 | 410 | 500 | 3.0 | 2.5 |
| 46 | Benz[a]anthracene-7,12-dione | 50 | polyvinyl-carbazole | 50 | 370 | 300 | 0.9 | 1.2 |
| 47 | ditto | 50 | poly-4-vinyl-dibenzofuran | 50 | 340 | 350 | 9.0 | 9.0 |
| 48 | ditto | 50 | polyketone (PK 252) | 50 | 380 | 320 | 5.0 | 5.0 |
| 49 | ditto | 50 | poly(p-phenoxy-phenyl)sulfide | 50 | 350 | 290 | 4.0 | 4.0 |
| 50 | ditto | 50 | 2-vinyl-naphthalene | 50 | 410 | 330 | 8.0 | 10.0 |
| 51 | 9-dicyanomethylene-2,4,7-trinitrofluorene | 75 | polyvinyl-carbazole | 25 | 630 | 720 | 1.2 | 1.1 |

TABLE V—Continued

| EX. NO. | SENSITIZER | % | POLYMER | % | C.A. + | C.A. − | T½ + | T½ − |
|---|---|---|---|---|---|---|---|---|
| 52 | 9-dicyanomethylene-2,4,7-trinitrofluorene | 75 | polyvinyl-carbazole | 25 | 340 | 280 | 1.6 | 1.7 |
| 53 | ditto | 75 | polyketone (PK 252) | 25 | 370 | 450 | 2.5 | 2.5 |
| 54 | 3,5-dinitrobenzoic acid | 5 | polyvinyl-carbazole | 95 | 165 | 280 | 0.8 | 0.45 |
| 55 | ditto | 5 | poly-4-vinyl-dibenzofuran | 95 | 520 | 580 | 10.0 | 10.0 |
| 56 | ditto | 5 | polyketone (PK 252) | 95 | 620 | 650 | 2.4 | 1.9 |
| 57 | ditto | 5 | poly (p-phenoxy-phenyl) sulfide | 95 | 410 | 540 | 3.0 | 3.0 |
| 58 | ditto | 5 | 2-vinyl-naphthalene | 95 | 420 | 400 | 2.0 | 2.0 |
| 59 | tetrachloro phthalic anhydride | 10 | poly-4-vinyl-bibenzofuran | 90 | 980 | 680 | 10.0 | 10.0 |
| 60 | ditto | 10 | polyketone (PK 252) | 90 | 410 | 380 | 2.0 | 2.0 |
| 61 | ditto | 10 | poly-2-vinyl naphthalene | 90 | 840 | 930 | 2.5 | 1.8 |
| 62 | tetranitro-naphthalene | 10 | poly-4-vinyl dibenzofuran | 90 | 390 | 480 | 1.4 | 2.0 |
| 63 | ditto | 10 | polyketone (PK 252) | 90 | 440 | 570 | 1.1 | 0.9 |
| 64 | ditto | 10 | poly-2-vinyl naphthalene | 90 | 280 | 310 | 2.0 | 1.2 |
| 65 | tetracyanoethylene | 2 | polyvinyl-carbazole | 98 | 120 | 120 | 1.2 | 0.8 |
| 66 | ditto | 2 | polyketone (PK 252) | 98 | 370 | 280 | 5.0 | 5.0 |
| 67 | trinitro-phenanthraquinone | 25 | polyvinyl-carbazole | 75 | 170 | 200 | 2.6 | 2.5 |
| 68 | trinitro-phenanthraquinone | 25 | poly-4-vinyl dibenzofuran | 75 | 170 | 200 | 2.6 | 2.5 |
| 69 | ditto | 25 | polyketone (PK 252) | 75 | 450 | 600 | 2.0 | 2.5 |

EXAMPLES 70–98

Additional experiments were run using pigments with the structures shown below:

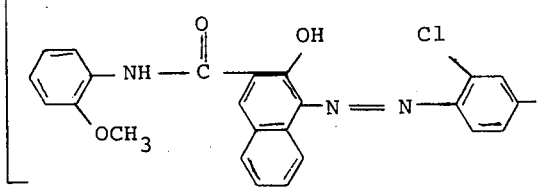

Pigment J

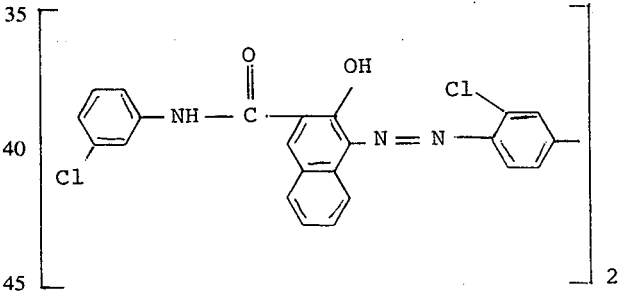

Pigment M

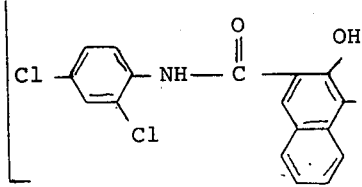

Pigment K

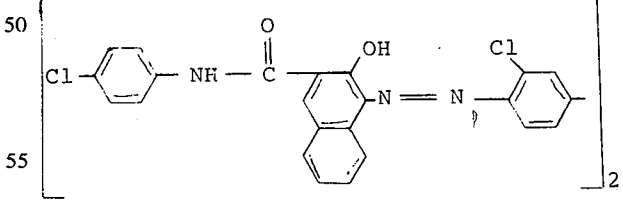

Pigment N

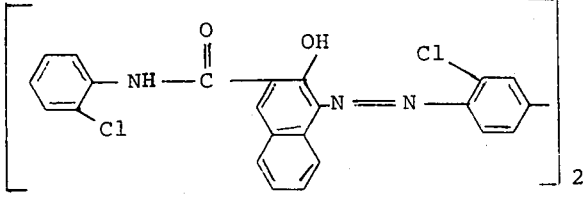

Pigment L

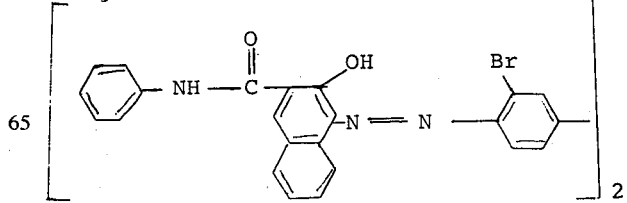

Pigment O

Pigment P

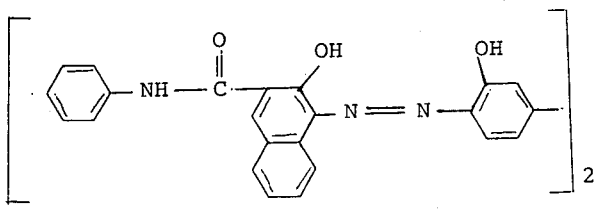

Pigment Q

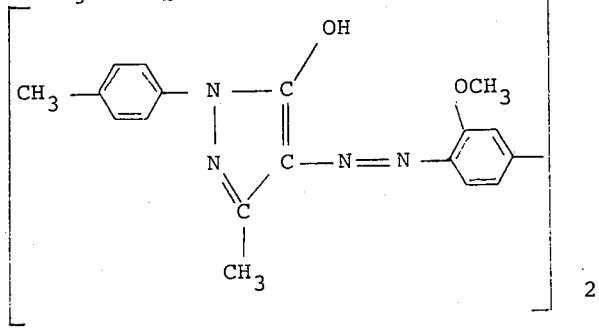

Pigments J through Q inclusive were measured in four different types of plates, numbered Plates 5-8 inclusive. In each case the milled pigment was coated on a conductive substrate. In Plate 5, the pigment with no binder and no overcoat was used. (Measurements in this system were with full tungsten light. In all other systems, measurements were with 1.16 NDS and O.G.) In Plate 6, 5 percent by weight of the milled pigment was mixed with a 1:1 molar mixture of TNF and polyvinyl carbazole. In Plate 7, 10 percent by weight of the pigment was mixed with a mixture of TNF (20 percent) and polyvinyl carbazole. In Plate 8, 10 percent of the pigment by weight was mixed with a 1:1 by weight mixture of TNF and Mylar adhesive 49,000.

| Pigment J Example No. | Plate | T ½ (+) | T ½ (−) | C.A. (+) | C.A. (−) |
|---|---|---|---|---|---|
| 70 | 5 | 0.35 | 0.45 | 270 | 250 |
| 71 | 6 | 1.1 | 0.55 | 520 | 720 |
| 72 | 7 | 1.0 | 1.2 | 420 | 470 |
| 73 | 8 | 2.4 | 1.1 | 400 | 620 |

| Pigment K Example No. | Plate | T ½ (+) | T ½ (−) | C.A. (+) | C.A. (−) |
|---|---|---|---|---|---|
| 74 | 5 | Not available | | | |
| 75 | 6 | 3.3 | 0.75 | 220 | 300 |
| 76 | 7 | 5.4 | 7.0 | 550 | 560 |
| 77 | 8 | 5.4 | 3.0 | 600 | 700 |

| Pigment L Example No. | Plate | T ½ (+) | T ½ (−) | C.A. (+) | C.A. (−) |
|---|---|---|---|---|---|
| 78 | 5 | 0.55 | 0.2 | 260 | 320 |
| 79 | 6 | 1.8 | 0.5 | 400 | 410 |
| 80 | 7 | 3.4 | 1.1 | 580 | 900 |
| 81 | 8 | 3.5 | 1.1 | 580 | 880 |

| Pigment M Example No. | Plate | T ½ (+) | T ½ (−) | C.A. (+) | C.A. (−) |
|---|---|---|---|---|---|
| 82 | 5 | 0.5 | 0.2 | 200 | 240 |
| 83 | 6 | 4.2 | 1.0 | 560 | 700 |
| 84 | 7 | 3.0 | 3.4 | 600 | 700 |
| 85 | 8 | 7.2 | 3.0 | 600 | 700 |

-Continued

| Pigment N Example No. | Plate | T ½ (+) | T ½ (−) | C.A. (+) | C.A. (−) |
|---|---|---|---|---|---|
| 86 | 5 | 0.8 | 0.6 | 250 | 250 |
| 87 | 6 | 1.5 | 0.8 | 700 | 800 |
| 88 | 7 | 2.0 | 8.0 | 650 | 720 |
| 89 | 8 | 4.5 | 3.8 | 760 | 920 |

| Pigment O Example No. | Plate | T ½ (+) | T ½ (−) | C.A. (+) | C.A. (−) |
|---|---|---|---|---|---|
| 90 | 5 | 2.9 | 0.6 | 400 | 430 |
| 91 | 6 | 1.4 | 0.6 | 880 | 800 |
| 92 | 7 | 0.9 | 1.2 | 620 | 550 |
| 93 | 8 | 1.1 | 1.0 | 620 | 800 |

| Pigment P Example No. | Plate | T ½ (+) | T ½ (−) | C.A. (+) | C.A. (−) |
|---|---|---|---|---|---|
| 94 | 5 | 8.0 | 10.0 | 35 | 40 |

| Pigment Q Example No. | Plate | T ½ (+) | T ½ (−) | C.A. (−) | C.A. (+) |
|---|---|---|---|---|---|
| 95 | 5 | 2.9 | 3.9 | 140 | 140 |
| 96 | 6 | 5.0 | 0.6 | 150 | 410 |
| 97 | 7 | 1.9 | 1.7 | 600 | 380 |
| 98 | 8 | 5.2 | 3.6 | 420 | 360 |

What is claimed is:

1. In an electrophotographic reproduction process which comprises the steps of uniformly corona charging a photoconductor on a conductive substrate and imagewise exposing the photoconductor to light, the improvement according to which the photoconductor comprises pigment particles and binder material, with the pigment particles being present as polymolecular aggregates less than five microns in size and having a formula

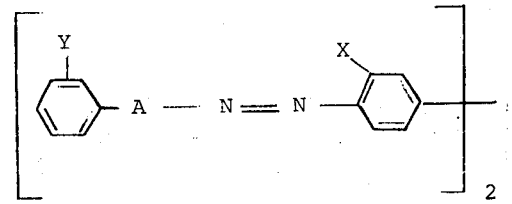

wherein A is selected from the group consisting of:

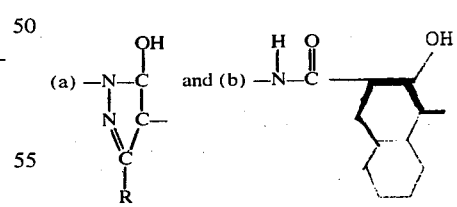

wherein R is selected from the group consisting of lower alkyl and

lower alkyl, and X and Y each selected from the group consisting of:

H, CH$_3$, OCH$_3$, OC$_2$H$_5$, OH, Cl and Br, with the pigment particles being present in an amount of from 5 percent to 10 percent by weight of the total weight of the pigment particles plus the binder material.

2. A process as claimed in claim 1 wherein the particle size of the pigment is less than about 1 micron.

3. A process as claimed in claim 1 wherein the pigment is present as a layer overcoated with a binder layer capable of transporting the charge.

4. A process as claimed in claim 1 wherein the pigment is dispersed in a binder which is a charge transport material.

5. A process as claimed in claim 4 wherein the binder is photoconductive per se.

6. A process as claimed in claim 4 wherein trinitrofluorenone has been added to the binder.

7. A process as claimed in claim 1 wherein the pigment is 3,3' dichloro-4,4' diphenyl bis-(1''-azo-2''hydroxy-3''-naphthanilide).

8. A process as claimed in claim 1 wherein the pigment is 3,3'dimethoxy-4,4'diphenyl bis-(1''azo-2''hydroxy-3''-naphthanilide).

9. A process as claimed in claim 1 wherein the pigment is 3,3'dimethyl-4,4'diphenyl bis-(1''azo-2''hydroxy-3''-naphthanilide).

10. A process as claimed in claim 1 wherein the pigment is 3,3'dibromo-4,4'diphenyl-bis-(1''azo-2''hydroxy-3''-naphthanilide).

11. A process as claimed in claim 1 wherein the pigment is 4,4' diphenyl-bis-(1''-azo-2''hydroxy-3''-naphthanilide).

* * * * *